United States Patent [19]
Sadahiro

[11] Patent Number: 6,095,920
[45] Date of Patent: Aug. 1, 2000

[54] IMAGE SYNTHESIS METHOD, GAMES MACHINE, AND INFORMATION STORAGE MEDIUM

[75] Inventor: Yuichiro Sadahiro, Edogawa-ku, Japan

[73] Assignee: Namco Ltd., Tokyo, Japan

[21] Appl. No.: 08/945,429

[22] PCT Filed: Feb. 28, 1997

[86] PCT No.: PCT/JP97/00606

§ 371 Date: Oct. 20, 1997

§ 102(e) Date: Oct. 20, 1997

[30] Foreign Application Priority Data

Feb. 29, 1996 [JP] Japan ................................. 8-071166

[51] Int. Cl.$^7$ ............................................. A63F 7/20
[52] U.S. Cl. .......................... 463/2; 434/31; 434/35; 434/70
[58] Field of Search ............................ 463/2; 434/65–69, 434/15, 31, 35, 37, 38, 70

[56] References Cited

U.S. PATENT DOCUMENTS 5,354,202  10/1994  Moncrief et al. ..................... 434/69
5,388,990  2/1995  Beckman ............................... 434/38

FOREIGN PATENT DOCUMENTS 8-155140  6/1996  Japan .

*Primary Examiner*—Valencia Martin-Wallace
*Assistant Examiner*—Sheila Clayton
*Attorney, Agent, or Firm*—Oliff & Berridge, PLC

[57] ABSTRACT

The objective of this invention is to provide an image synthesis method, games machine, and information storage medium that make it possible for a game to be satisfyingly enjoyable, even when a single player is playing it. History information relating to the performance of the player is recorded during one game session, and this history information is reproduced in another game session. A virtual player performs based on the thus-reproduced history information, and thus acts so as to affect the game result of the player. The virtual player either assists the player or acts as a combat opponent. This makes it possible to implement a game that is interesting even in single-player mode.

37 Claims, 8 Drawing Sheets

FIG.2A

```
RECORD HISTORY INFORMATION ?

YES         NO

RECORDING START----
```

FIG.2B

```
SAVE HISTORY INFORMATION ?

YES         NO

RECORDING SAVE----
```

FIG.2C

```
WHICH HISTORY INFORMATION
           TO REPRODUCE ?

▷ ADD
      PSU
      DDD
      TAK
```

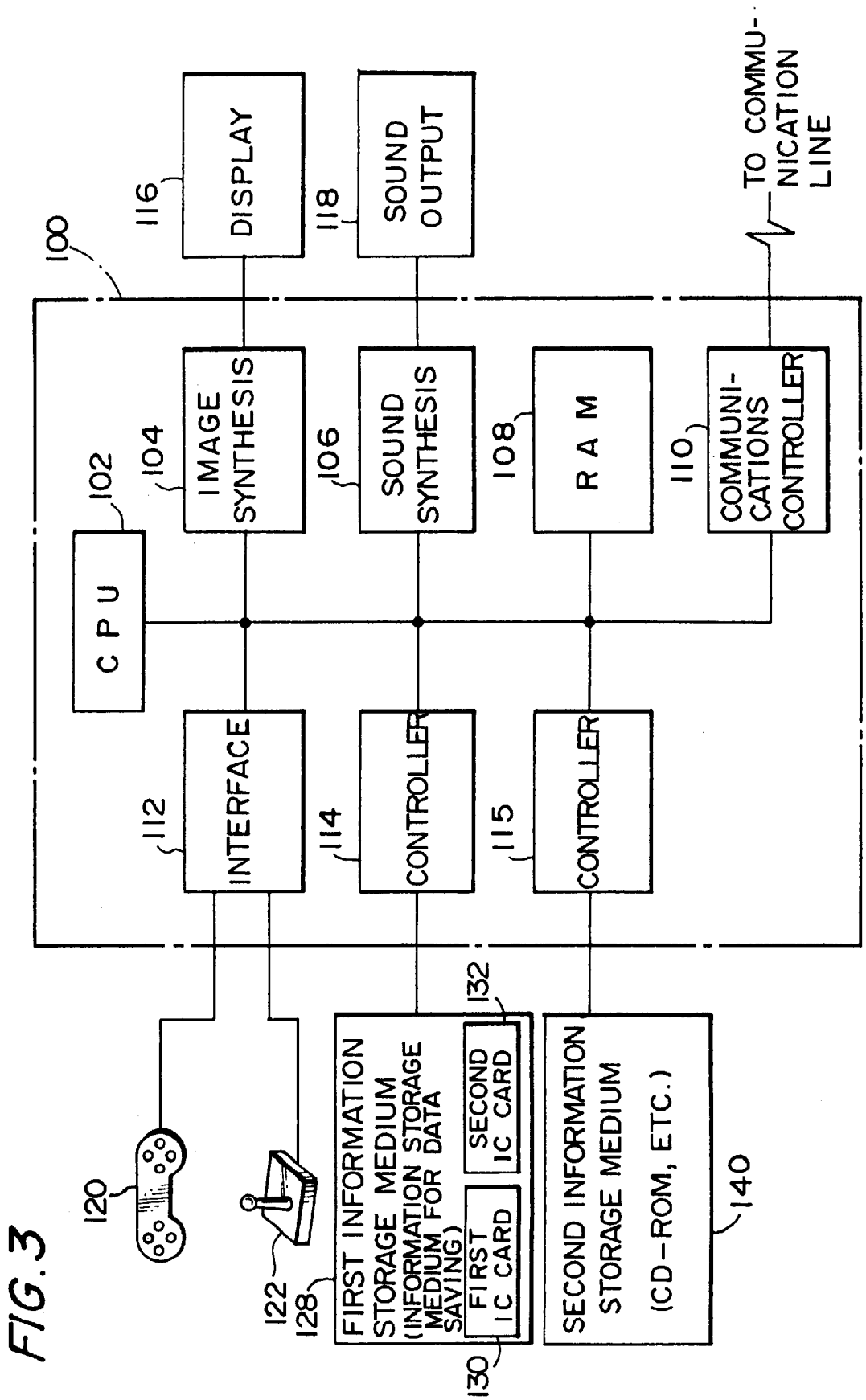

IMAGE SYNTHESIS METHOD, GAMES MACHINE, AND INFORMATION STORAGE MEDIUM

TECHNICAL FIELD

This invention relates to an image synthesis method, a games machine, and an information storage medium.

BACKGROUND OF ART

With a games machine, a player can enjoy games either fighting against another player or fighting together with another player to overcome a common enemy. In such a case, first and second game controllers could be connected to a single games machine, for example, and first and second players could manipulate the first and second game controllers to play such a combat or allied-combat game.

On the other hand, it is sometimes necessary for a games machine to allow a player to enjoy a game alone (single-player mode), in which case the player can fight against a computer player or fight together with a computer player to overcome a common enemy.

However, a computer player can often act only as determined previously by a game program or the like, so it lacks opposition as a combat opponent and is not supportive as an allied partner. That is why games machines up until the present have a problem in that, although such games are enjoyable in multiple-player mode, it is difficult to enjoy them in single-player mode.

This invention was devised in the light of this technical problem and has as its objective the provision of an image synthesis method, games machine, and information storage medium that make it possible to provide thoroughly enjoyable games, even when only one person is playing, for example.

DISCLOSURE OF THE INVENTION

In order to solve the above described problem, this invention provides an image synthesis method for creating a game image with which a player plays:

recording history information relating to the performance of the player in one game session;

reproducing the history information in another game session that differs from the one game session; and creating a game image in which a virtual player participates in the other game session together with the player, the virtual player acting to affect the game result of the player based on the reproduced history information.

This aspect of the invention makes it possible to enjoy a game in which a virtual player that acts in accordance with history information of playing participates. The virtual player does not act as determined previously by a game program or the like; it acts in a real manner, reflecting characteristics of the player such as techniques and habits. With this invention, the performance of the virtual player affects the game result of the player. This aspect of the invention can therefore make it possible for the player to experience the feeling of fighting as if against another player, or the feeling of partnering another player in allied combat, even when playing alone. This makes the game more interesting.

This invention also relates to an image synthesis method for creating a game image with which a player plays:

recording history information relating to the performance of the player in one game session;

reproducing the history information in another game session that differs from the one game session; and creating a game image in which a virtual player participates in the other game session together with the player, the virtual player acting to assist the player based on the reproduced history information.

In accordance with this aspect of the invention, a virtual player that acts in accordance with the history information of the player can participate in the game session as an auxiliary player, thus enabling the player to play more advantageously through the game. In particular, since the virtual player reflects characteristics of the player such as techniques and habits, it does not irritate the player and can make the game more absorbing to the player, unlike an auxiliary computer player that can only perform predetermined actions.

This invention further relates to an image synthesis method for creating a game image with which a player shoots at a given target by using an offensive object:

recording history information for specifying shooting timing and at least one of the position and direction of shooting in one game session;

reproducing the history information in another game session that differs from the one game session; and creating a game image in which a virtual player participates in the other game session together with the player, the virtual player shooting at a target based on the reproduced history information.

In accordance with this aspect of the invention, a virtual player that shoots based on information that specifies the position, direction and timing of shooting, which is comprised within the history information, can participate in the game session. This makes it possible for the player to enjoy a shooting game together with this virtual player. Note that information that specifies the position and direction of shooting could equally specify the position and direction of a moving body that performs the shooting, or specify the position and direction of sights. Furthermore, only one of the position and direction could be specified.

This invention is further characterized in that, information for specifying shooting areas of a plurality of players is recorded together with the history information when the shooting areas are previously allocated to the plurality of players. With this arrangement, when history information that was recorded during play in a first shooting area (an area wherein a moving body manipulated by the player moves) is reproduced, for example, the virtual player is enabled to play in that first shooting area.

This invention is still further characterized in that the recorded history information is transferred to a games machine of another player via an information storage medium for saving data or a communication line. This makes it possible to include in the game not only a virtual player that plays based on the history information of the player's own playing, but also a virtual player that plays based on the history information of another player's playing.

This invention is yet further characterized in that details of the history information are updated so that the virtual player acts in ways that differ from those of the one game session. This modification makes it possible to further increase the variety of playing of the virtual player and also control the degree of difficulty of the game.

This invention is further characterized in that history information up to an intermediate point within the one game session is recordable. With this arrangement, history information can be recorded even if a game session has not ended. Thus a player who encounters a stage within that one game session which is very difficult can clear that difficult stage by partnering a virtual player that acts according to history information recorded up until the intermediate point.

This invention also provides an image synthesis method for creating a game image with which a player plays:

creating a game image in which an auxiliary computer player acts in cooperation with the player, the auxiliary computer player assisting the player in game playing; and comparing the game result of the player and the game result of the auxiliary computer player, and creating an image for selecting another auxiliary computer player that acts in a different manner from the auxiliary computer player when the game result of the player is ahead of the game result of the auxiliary computer player.

In accordance with this aspect of the invention, if the game result of the player is ahead of that of the auxiliary computer player, the player can then partner, for example, an auxiliary computer player that has even better techniques, enabling the player to progress advantageously through the game.

BRIEF DESCRIPTION OF DRAWINGS

FIGS. 2A, 2B, and 2C show examples of selection screens for recording, saving, and reproducing history information;

FIG. 3 shows an example of the configuration of the games machine of this embodiment;

BEST MODE FOR CARRYING OUT THE INVENTION

An embodiment of this invention will now be described with reference to the accompanying figures.

Figure 1A:
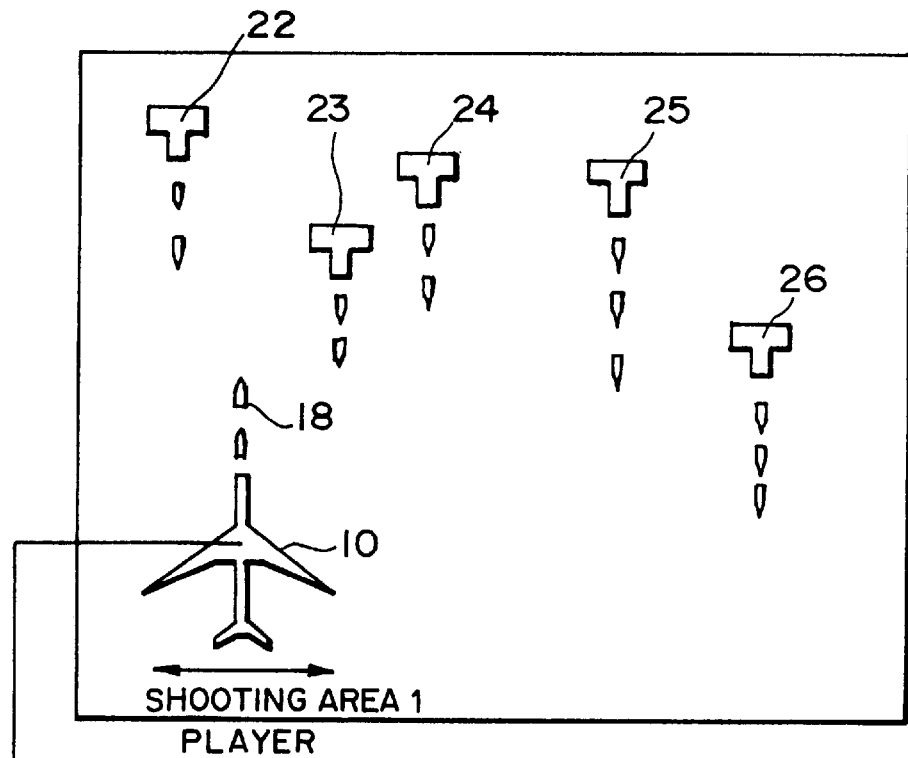
FIGS. 1A and 1B show examples of game images displayed by this embodiment.
Figure 1B:
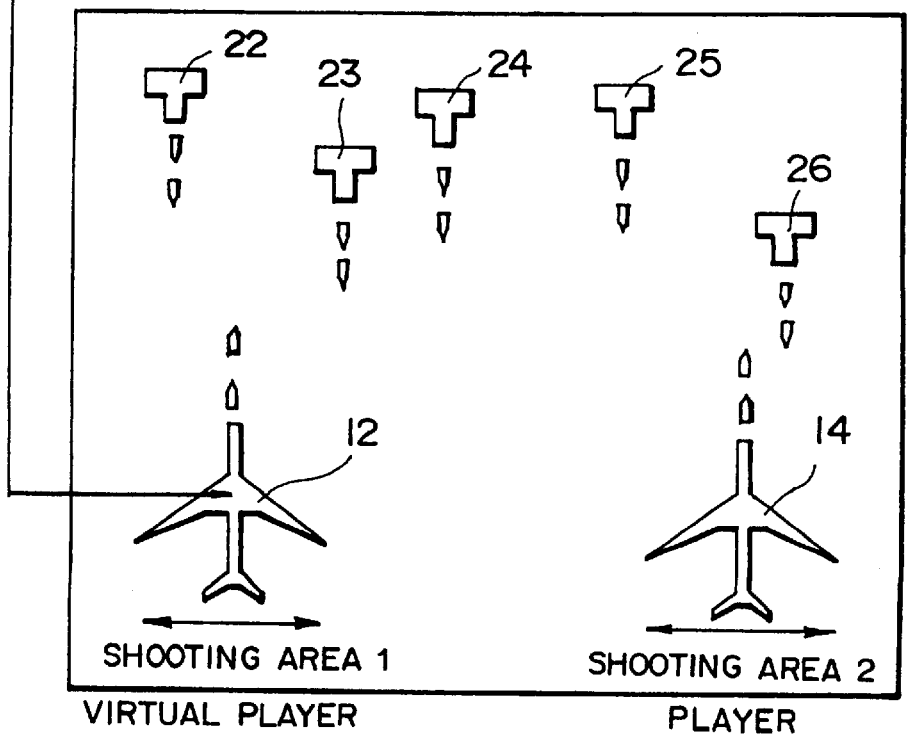

FIGS. 1A and 1B show examples of game images displayed by this embodiment. In FIG. 1A, a player manipulates a game controller to move a fighter aircraft (moving body) 10 to the left or right and also shoot given missiles (offensive objects) 18. This fends off the attack of enemies 22 to 26 and also attacks the enemy, to gain points.

With this embodiment, history information relating to the performance of the player (that is, information relating to factors such as how the player manipulates the game controller and the timing thereof) can be recorded during one of these game sessions. When history information is to be recorded, the recording of history information is selected from a selection screen such as that shown by way of example in FIG. 2A, before the game starts. When this game starts, the game is played in the ordinary manner. After the game ends, saving of this history information can be selected from a selection screen such as that shown in FIG. 2B. At this point, a file name could be attached to the history information when it is saved, if necessary. To reproduce history information for another game session, the reproduction of history information is selected from a selection screen such as that shown in FIG. 2C by way of example. This makes it possible for a virtual player (a computer player that simulates the play of a player) to manipulate a fighter aircraft 12 in accordance with the reproduced history information, to shoot at the enemies 22 to 26, as shown in FIG. 1B. During this time, the player can also participate in this game session, so that the player can use a fighter aircraft 14 to shoot at the enemies 22 to 26.

With this embodiment, a virtual player that acts based on history information recorded during one game session can be allowed to participate in another game session. During this time, this embodiment enables the virtual player to act in a manner that affects the game result of the player. The virtual player of this embodiment could, for example, be allowed to participate as an auxiliary computer player that cooperates with the player to ado to the attack on the enemy. If the fighter aircraft 12 of the virtual player in this configuration destroys a large number of enemies, for example, the possibility of the fighter aircraft 14 of the player being destroyed by those enemies is removed, so that the game becomes easier for the player. This increases the likelihood of the player being able to clear the game stage. In other words, the playing of the virtual player is intended to affect the game result of the player. If the virtual player is allowed to participate in a game session as an opponent of the player in combat, on the other hand, the fact that the fighter aircraft 12 of the virtual player destroys a large number of enemies removes the possibility of the player being able to destroy those enemies. This reduces the player's enemy destruction points so that the playing of the virtual player affects the game result of the player in this case too.

Since a virtual player that affects the game result of the player is allowed to participate in this embodiment, the player can experience a feeling of playing a game as if with another player, even if the player is playing the game alone. This makes it possible to increase the interest of the game, even in single-player mode.

An example of the configuration of a games machine that can implement this embodiment will now be described, with reference to FIG. 3. Game controllers 120 and 122 (operating means) for inputting the operations of players are connected to a main unit 100, and a first information storage medium 128 (IC cards 130 and 132) and a second information storage medium 140 are also connected to the main unit 100 freely removable therefrom. Images and game sounds created by the main unit 100 are output to a display device 116 and sound output device 118, thus enabling the players to enjoy the game.

In this case, the first information storage medium 128 is an information storage medium for saving data which is used to store information such as that relating to players.

Means such as a CD-ROM, game cassette, DVD (Digital video disk), MO (Magnet optical disk), floppy disk, or memory is used as the second information storage medium 140. Information that is stored in this second information storage medium 140 includes: information for recording history information relating to the performance of the player in one game session; information for reproducing that history information in another game session that differs from that one game session; information for creating a game image in which a virtual player participates in the other game session together with the player, the virtual player acting to affect the game result of the player based on the reproduced history information; information for creating a game image in which an auxiliary computer player acts in cooperation with the player, the auxiliary computer player assisting the player in game playing; and information for comparing the game result of the player and the game result of the auxiliary computer player and for creating an image for selecting another auxiliary computer player that acts in a different manner from the auxiliary computer player when the game result of the player is ahead of the game result of the auxiliary computer player. This information is hereinafter called stored information. This stored information comprises at least one type of information, such as program coding for performing the above described various processing, image information, sound information, shape information for display objects, table data, list data, or player information.

The main unit 100 comprises a CPU 102, an image synthesis section 104, a sound synthesis section 106, RAM 108, a communications controller 110, an interface 112, and controllers 114 and 115. In this case, the CPU 102 performs various computations such as games computations based on information that is input from the game controllers 120 and 122 through the interface 112, information that is loaded from the first information storage medium 128 through the controller 114, and the above described stored information that is loaded from the second information storage medium 140 through the controller 115. The image synthesis section 104 and the sound synthesis section 106 synthesize the game images and sounds, based on the results of the game computations performed by the CPU 102, and output them. The RAM 108 acts as working memory for the CPU 102 or the like. The communications controller 110 has functions such as those of a modem and transfers data to and from a host system or another games machine, through a communication line.

The processing of images to be displayed, such as those shown in FIGS. 1A to 2C, is implemented by components such as the image synthesis section 104 and the CPU 102 which operates according to the information from the game controllers 120 and 122 and the stored information from the second information storage medium 140.

Note that any type of re-writable information storage medium can be used as the first information storage medium (information storage medium for saving data) 128, instead of an IC card, such as an magnet optical disk, hard disk, or magnetic disk. If the first information storage medium 128 has sufficient capacity to enable it to store the above described stored information, the first information storage medium 128 and the second information storage medium 140 can be made the same.

When this history information is to be recorded, information such as the player's manipulation information from the start of the game up until a given time is stacked in the RAM 108 as history information. If saving of this history information is directed on the screen as shown in FIG. 2B, the stacked history information is stored in the first information storage medium 128. To reproduce the history information, the history information stored in the first information storage medium 128 is once again loaded into the RAM 108.

Figure 4:
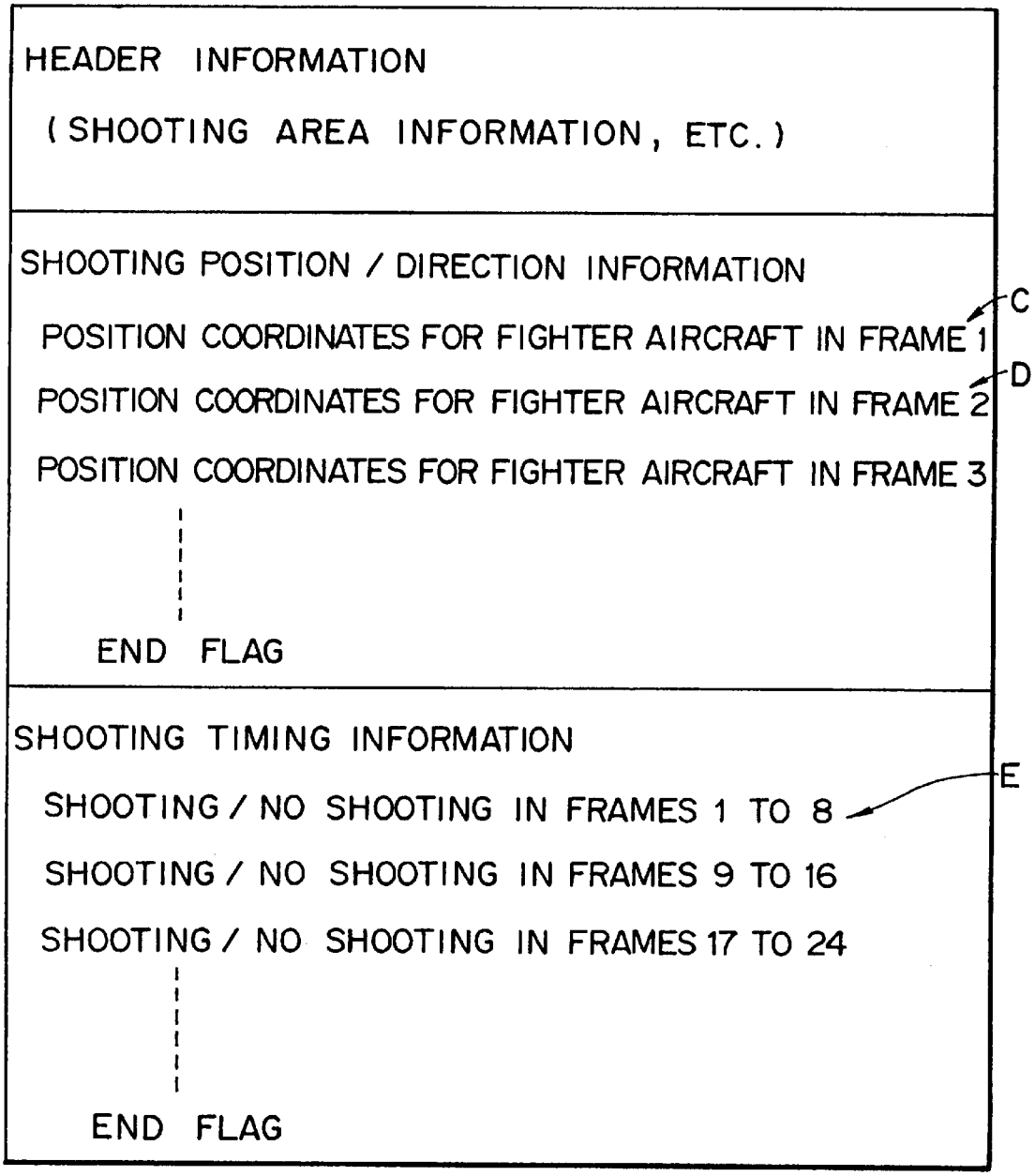
FIG. 4 shows an example of the format of history information.

An example of the format of history information is shown in FIG. 4. This history information comprises header information, shooting position/direction information, and shooting timing information, and the header information comprises information such as shooting area information. In this case, shooting area information is information for specifying shooting areas 1 and 2 in FIGS. 1A and 1B. For example, the area in which each player shoots is predetermined in FIGS. 1A and 1B. In such a case, history information for the player shooting in shooting area 1 is recorded, and it is necessary for the shooting to occur in shooting area 1 during the reproduction to cause the destruction of enemies in a similar manner to that during the recording. Thus information for the perception of which shooting area was played in during the recording is comprised within the history information of this embodiment.

The shooting position/direction information is information for specifying the position and direction of the shooting. Since the direction of shooting of the fighter aircraft shown in FIGS. 1A and 1B is fixed in this embodiment, the shooting position/direction information is the position coordinates of the fighter aircraft. One frame is $\frac{1}{15}$ seconds in this embodiment. The position coordinates of the fighter aircraft are recorded for each frame. More specifically, the position coordinates for the fighter aircraft in frames 1 and 2 are recorded at positions C and D in FIG. 4. Note that if, for example, sights are displayed on screen and the shooting is performed by moving these sights, the position coordinates of the sights are recorded as the shooting position/direction information.

The shooting timing information is information for specifying the timing of shooting. With this embodiment, whether or not shooting occurs is recorded for each frame. More specifically, if shooting occurs in frames 1 to 4 but shooting does not occur in frames 5 to 8, the data 11110000 is recorded at position E in FIG. 4 (a "1" is recorded when shooting occurs and a "0" is recorded when shooting does not occur).

Note that an end flag is recorded at the end of the shooting position/direction information and shooting timing information, to indicate that there is no more history information.

Figure 5:
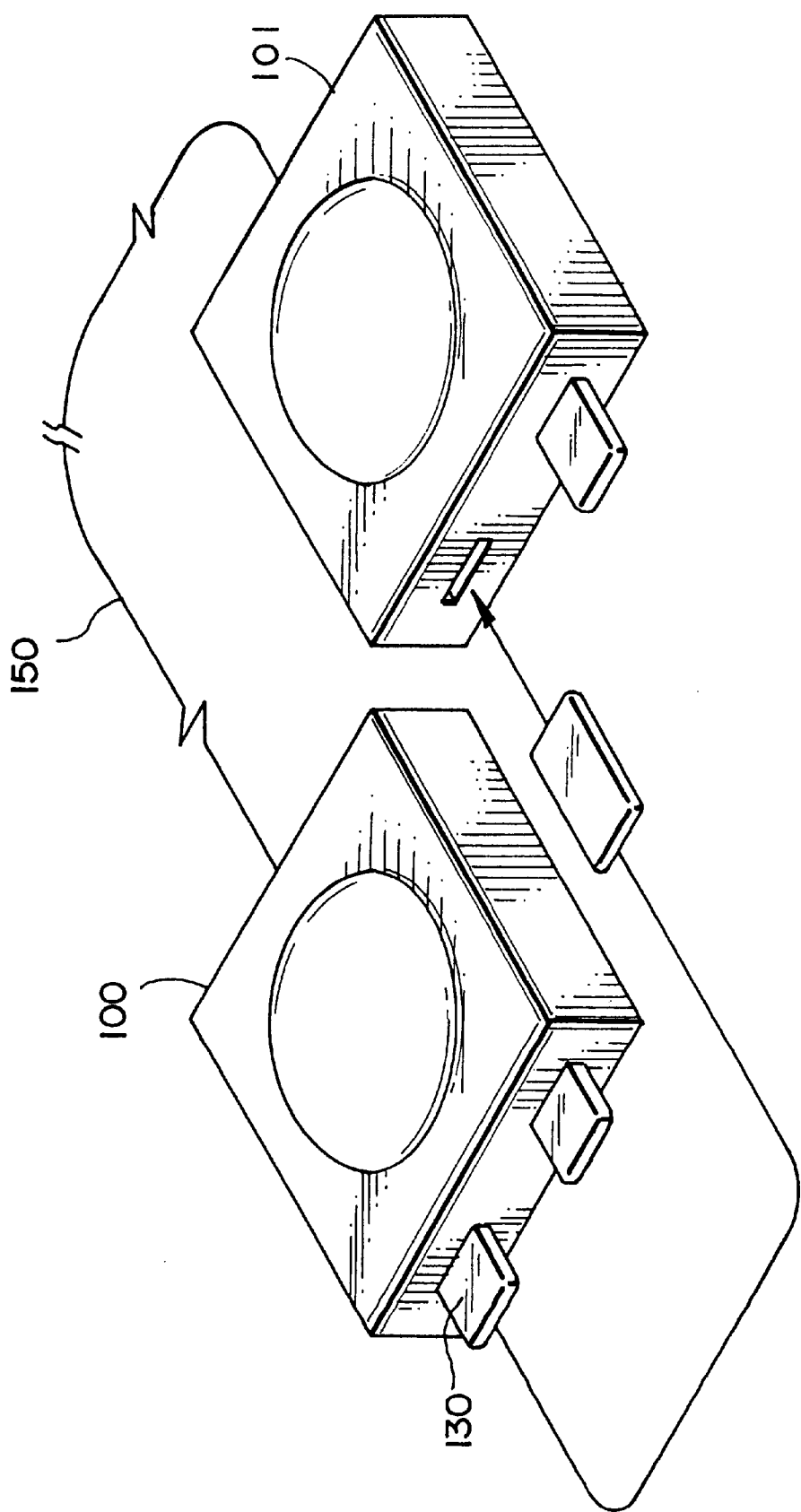
FIG. 5 is a view illustrative of the transfer of history information via an information storage medium for saving data or communication line.

With this embodiment, the recorded history information can be transferred to the games machine of another player, by the information storage medium for saving data or via a communication line. If, for example, as shown in FIG. 5, history information has been recorded in an IC card 130 inserted into the main unit 100 of the games machine of a first player, that IC card 130 can be inserted in a main unit 101 of the games machine of a second player, so that a virtual player that reproduces the playing of the first player can be made to play on the games machine of the second player. History information can be transferred in a similar manner to the games machine of the second player through the communications controller 110 and a communication line 150. The configuration of this embodiment thus enables a player to enjoy fighting with or against not only a virtual player that acts based on the player's own playing history information, but also a virtual player that acts based on another player's history information. This makes it possible to broaden the variety of ways of playing in single-player mode, doubling the interest of the game.

With this embodiment, the recorded history information need not be reproduced unchanged; details of the history information could be updated so that the virtual player can be made to play in ways that differ from those of the game session in which the recording was made. Various methods can be considered for updating the history information. For example, a single shooting of missiles during the recording could be modified to be three continuous shooting of missiles in the reproduction. This would make it possible to guide the fighting of the player in a profitable direction, if this virtual player is acting as a partner in allied combat.

Figure 6A:
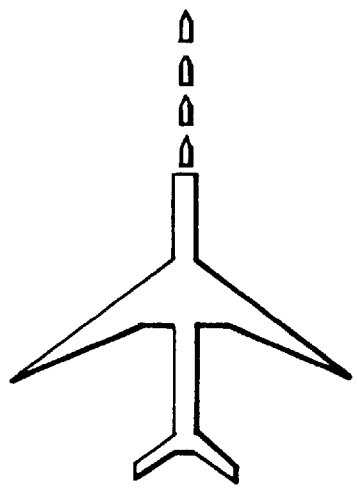
FIGS. 6A, 6B, and 6C are views illustrative of the updating of history information.
Figure 6B:
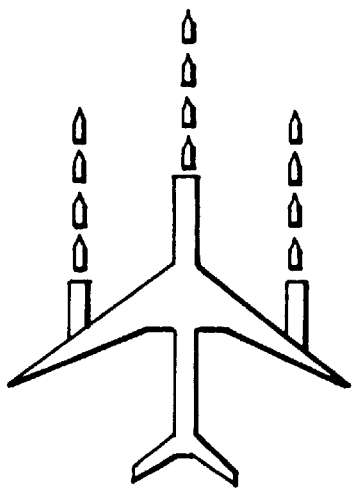
Figure 6C:
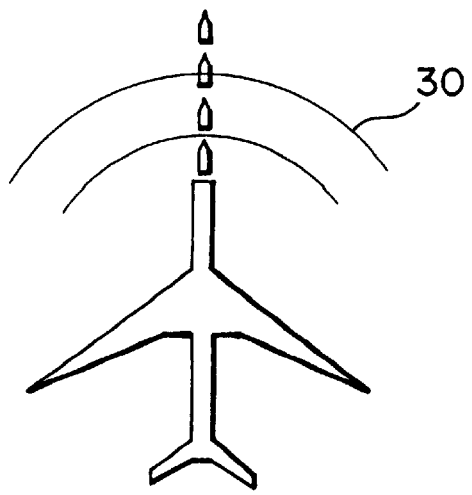

Alternatively, it could enable an increase in the degree of difficulty of the game, if the virtual player is acting as an opponent in combat. Similarly, barriers 30 that are not present during the recording could be created as shown in FIG. 6C during the reproduction. This modification would also lead the player profitably, enabling a change in the degree of difficulty of the game.

This embodiment is further characterized in that history information up to an intermediate point within the game session can be recorded. If, for example, the recording of history information is started from the screen of FIG. 2A, a pause is imposed partway during the game session, and the history information is saved from the screen of FIG. 2B, history information is recorded from the start of the game up until the point at which the game is paused. In such a case, the game session can be reproduced up until the point at which it was paused, in other words, until the end flag of FIG. 4 is detected. Similarly, even if the fighter aircraft of the player being recorded is destroyed and thus lost while history information is being recorded, history information up until the point at which the loss is recorded. If it is only possible to record history information up until the end of a game session (game stage), a problem occurs in that it would be difficult to record history information in a very difficult game stage. Since this embodiment enables recording of history information up to an intermediate point within the game session, this problem does not occur. Even if a virtual player acting as a partner can only assist the player up until an intermediate point within a game session, this would enable the player to advance profitably through the game at least up until that intermediate point, making it easy for the player to clear a very difficult game stage.

Figure 7A:
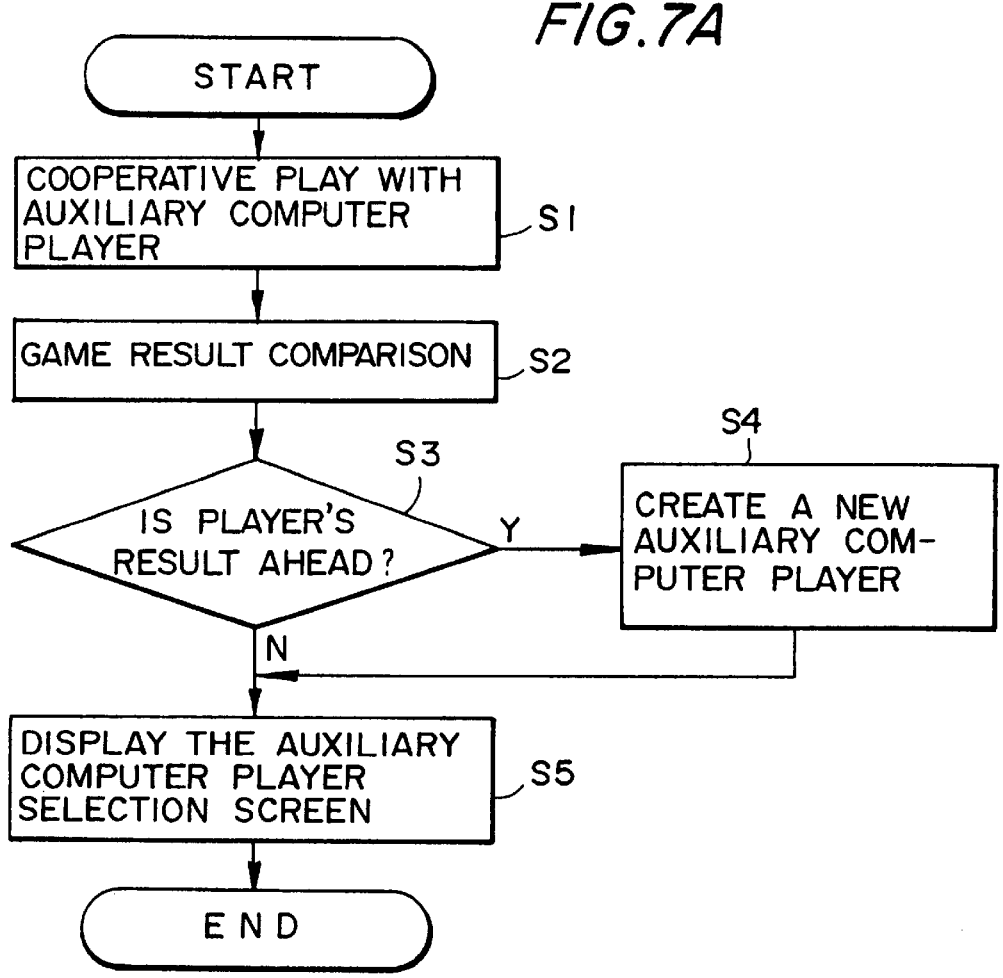
FIGS. 7A, 7B, and 7C are views illustrative of the appearance of new auxiliary computer players.
Figure 7B:
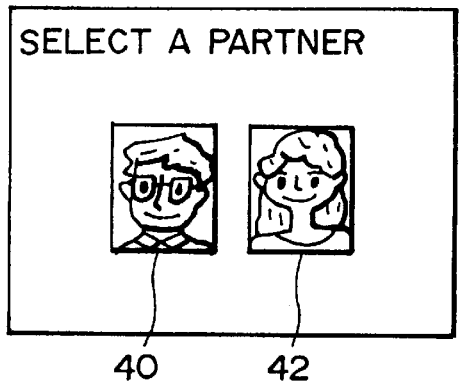
Figure 7C:
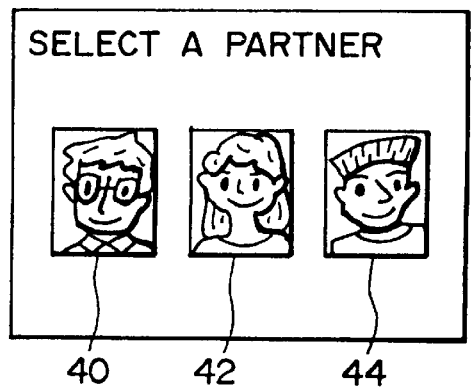

Note that a further contrivance can be used with this embodiment to further increase the interest of the game in single-player mode, as described below. In other words, the player can first select an auxiliary computer player to act as a partner in battling an enemy. At the end of a game session, if the player has obtained more points than the auxiliary computer player during that session, the player can select a new, stronger auxiliary computer player. The flow chart of processing performed in this case is shown in FIG. 7A. First of all, cooperative play with an auxiliary computer player is set up (step S1). The selection of an auxiliary computer player in this case is done from a selection screen such as that shown in FIG. 7B. Only two auxiliary computer players are shown in the selection screen of FIG. 7B. Next, the game results of the player and the auxiliary computer player are compared (step S2), and, if the player's result is ahead, a new auxiliary computer player is created on the selection screen (steps S3, S4, and S5). In other words, a new auxiliary computer player 44 that is stronger than auxiliary computer players 40 and 42 appears, as shown in FIG. 7C. The player can profitably progress in the subsequent session by forming a partnership with this auxiliary computer player 44 that has been made stronger, which makes the game more interesting. Note that, when a new auxiliary computer player has been generated, the player could select the old auxiliary computer player or the player could not select it. Similarly, the new auxiliary computer player could inherit the characteristics of an old auxiliary computer player to a certain extent, or a completely new type of auxiliary computer player could be generated.

Finally, devices of various different forms to which this embodiment is applied will be described below.

Figure 8A:
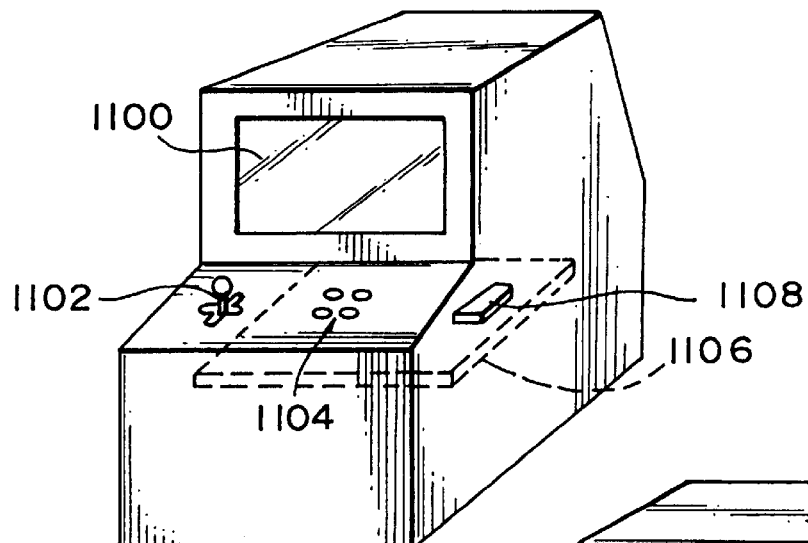
FIGS. 8A, 8B, and 8C show devices of various different forms to which this embodiment is applied.

An example of this embodiment applied to a arcade games machine is shown in FIG. 8A. A player enjoys the game by operating a joystick 1102 and buttons 1104, while viewing a game image projected onto a display 1100. Components such as a CPU, image synthesis IC, and sound synthesis IC are mounted on an IC board 1106 built into the apparatus. In this apparatus, the memory 1108 on the IC board 1106 is equivalent to the second information storage medium 140 of FIG. 3. In other words, the previously described stored information is stored in the memory 1108.

Figure 8B:
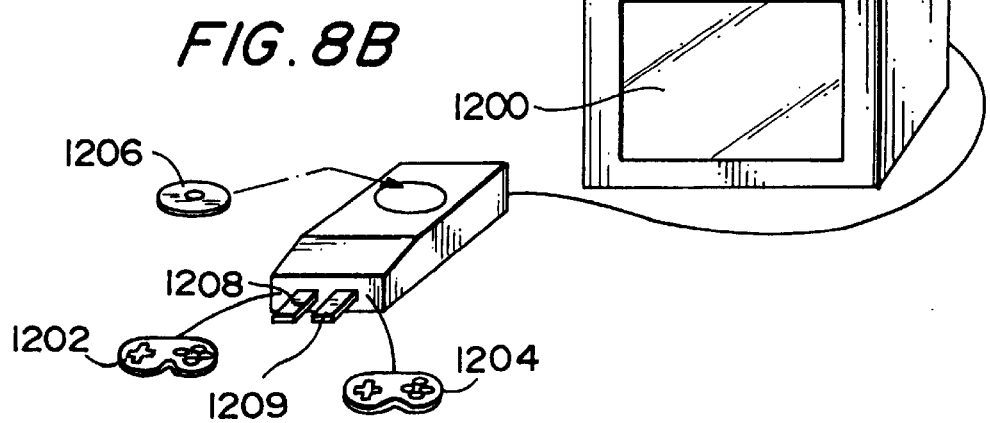

An example of this embodiment applied to a domestic games machine is shown in FIG. 8B. Players enjoy the game by operating game controllers 1202 and 1204 while viewing a game image that is projected onto a display 1200. In this case, the above described stored information is stored in a CD-ROM 1206 or the like, which is an information storage medium that can be freely inserted into and removed from the main unit.

Figure 8C:
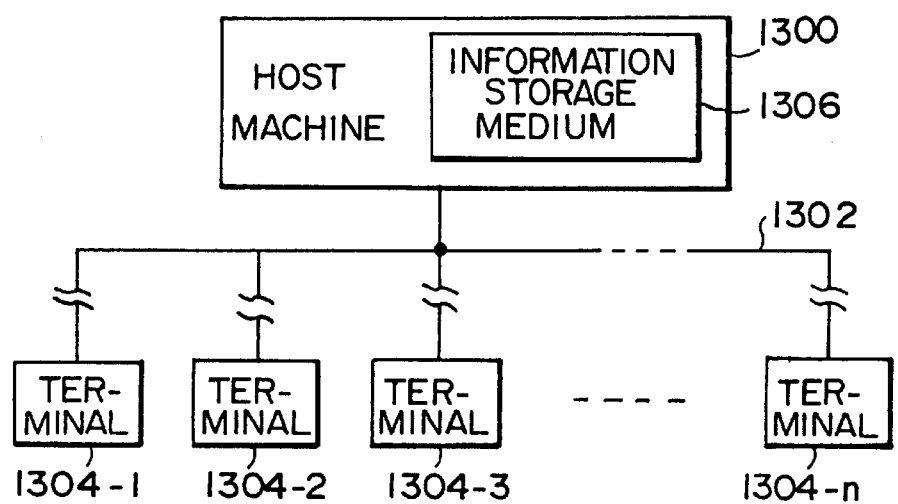

Another example of this embodiment applied to a games machine is shown in FIG. 8C, where the games machine comprises a host machine 1300 and terminals 1304-1 to 1304-n connected to the host machine 1300 by a communication line 1302. In this case, the above described stored information is stored in an information storage medium 1306 such as a magnetic disk, magnetic tape, or memory that can be controlled by the host machine 1300. If each of the terminals 1304-1 to 1304-n has a CPU, an image synthesis IC, and a sound synthesis IC so that game images and sounds can be synthesized thereby in a stand-alone manner, means such as a game program for synthesizing game images and sounds is transferred from the host machine 1300. On the other hand, if they cannot be synthesized in a stand-alone manner, the configuration is such that the host machine 1300 synthesizes the game images and sounds then transfers them to the terminals 1304-1 to 1304-n for output by those terminals.

Note that this invention is not limited to the embodiments thereof described above and thus it can be implemented in many various ways.

For example, this invention can be applied to various games other than that described in the embodiment above. It could be applied to a game in which the player competes at shooting at a target that appears on the screen, or cooperates at shooting at such a target. Alternatively, it could be a game in which a first player drives a vehicle a second player shoots from on top of that vehicle and one in which one of the first and second players is a virtual player. Alternatively, it could be a golf game in which the player plays against a virtual player that plays based on the player's own playing history information from a previous game. This invention could equally well be applied to an item-collection game, or a sports games such as an athletics game or skiing game.

This embodiment was described above with reference to a game in which one virtual player and one player participate. However, this invention also comprises cases in which a plurality of virtual players or a plurality of players participate.

Similarly, the form of history information should not be limited to that described with reference to this embodiment; it could equally well be used with games machines other than those of the construction shown in FIG. 3.

This invention can not only be applied to a domestic or games machine for an attraction, it can also be applied to various other kinds of games machines such as simulators, large attraction games machines where many players can participate, personal computers, multimedia terminals, and IC board that synthesize games images.

What is claimed is:

1. An image synthesis method for creating a game image with which a player plays, the method including:

recording history information relating to the performance of the player in one game session;

reproducing said history information in another game session that differs from said one game session; and creating a game image in which a virtual player participates in said other game session together with the player, said virtual player acting based on said reproduced history information and affecting the game result of the player at each stage of the game.

2. An image synthesis method for creating a game image with which a player plays, the method including:

recording history information relating to the performance of the player in one game session;

reproducing said history information in another game session that differs from said one game session; and creating a game image in which a virtual player participates in said other game session together with the player, the player acting against at least one common opponent, said virtual player acting against each common opponent based on said reproduced history information and affecting the game result of the player.

3. An image synthesis method for creating a game image with which a player shoots at a given target by using an offensive object, the method including:

recording history information for specifying shooting timing and at least one of the position and direction of shooting in one game session;

reproducing said history information in another game session that differs from said one game session; and creating a game image in which a virtual player participates in said other game session together with the player, said virtual player and said player interacting in shooting at common targets, said virtual player interacting with the player in shooting at the targets based on said reproduced history information and affecting the game result of the player.

4. The image synthesis method as defined in claim 3, wherein:

information for specifying shooting areas of a plurality of players is recorded together with said history information when the shooting areas are previously allocated to said plurality of players.

5. The image synthesis method as defined in claim 1, wherein:

said recorded history information is transferred to a games machine of another player via an information storage medium for saving data or a communication line.

6. The image synthesis method as defined in claim 2, wherein:

said recorded history information is transferred to a games machine of another player via an information storage medium for saving data or a communication line.

7. The image synthesis method as defined in claim 3, wherein:

said recorded history information is transferred to a games machine of another player via an information storage medium for saving data or a communication line.

8. The image synthesis method as defined in claim 1, wherein:

details of said history information are updated so that said virtual player acts in ways that differ from those of said one game session.

9. The image synthesis method as defined in claim 2, wherein:

details of said history information are updated so that said virtual player acts in ways that differ from those of said one game session.

10. The image synthesis method as defined in claim 3, wherein:

details of said history information are updated so that said virtual player acts in ways that differ from those of said one game session.

11. The image synthesis method as defined in claim 1, wherein:

history information up to an intermediate point within said one game session is recordable.

12. The image synthesis method as defined in claim 2, wherein:

history information up to an intermediate point within said one game session is recordable.

13. The image synthesis method as defined in claim 3, wherein:

history information up to an intermediate point within said one game session is recordable.

14. An image synthesis method for creating a game image with which a player plays, the method including:

creating a game image in which an auxiliary computer player acts in cooperation with the player, said auxiliary computer player assisting the player in game playing; and comparing the game result of the player and the game result of said auxiliary computer player, and creating an image for selecting another auxiliary computer player that acts in a different manner from said auxiliary computer player when the game result of the player is ahead of the game result of said auxiliary computer player.

15. A games machine for creating a game image with which a player plays, comprising:

means for recording history information relating to the performance of the player in one game session;

means for reproducing said history information in another game session that differs from said one game session; and means for creating a game image in which a virtual player participates in said other game session together with the player, said virtual player acting based on said reproduced history information and affecting the game result of the player at each stage of the game.

16. A games machine for creating a game image with which a player plays, comprising:

means for recording history information relating to the performance of the player in one game session;

means for reproducing said history information in another game session that differs from said one game session; and means for creating a game image in which a virtual player participates in said other game session together with the player, the player acting against at least one common opponent, said virtual player acting against each common opponent based on said reproduced history information and affecting the game result of the player.

17. A games machine for creating a game image with which a player shoots at a given target by using an offensive object, comprising:

means for recording history information for specifying shooting timing and at least one of the position and direction of shooting in one game session;

means for reproducing said history information in another game session that differs from said one game session; and means for creating a game image in which a virtual player participates in said other game session together with the player, said virtual player shooting at a target based on said reproduced history information.

18. A games machine for creating a game image with which a player plays, comprising:
means for creating a game image in which an auxiliary computer player acts in cooperation with the player, said auxiliary computer player assisting the player in game playing; and
means for comparing the game result of the player and the game result of said auxiliary computer player and for creating an image for selecting another auxiliary computer player that acts in a different manner from said auxiliary computer player when the game result of the player is ahead of the game result of said auxiliary computer player.

19. An information storage medium for creating a game image with which a player plays, comprising:
information for recording history information relating to the performance of the player in one game session;
information for reproducing said history information in another game session that differs from said one game session; and
information for creating a game image in which a virtual player participates in said other game session together with the player, said virtual player acting based on said reproduced history information and affecting the game result of the player at each stage of the game.

20. An information storage medium for creating a game image with which a player plays, comprising:
information for recording history information relating to the performance of the player in one game session;
information for reproducing said history information in another game session that differs from said one game session; and
information for creating a game image in which a virtual player participates in said other game session together with the player, said virtual player acting to assist the player based on said reproduced history information.

21. An information storage medium for creating a game image with which a player shoots at a given target by using an offensive object, comprising:
information for recording history information for specifying shooting timing and at least one of the position and direction of shooting in one game session;
information for reproducing said history information in another game session that differs from said one game session; and
information for creating a game image in which a virtual player participates in said other game session together with the player, said virtual player shooting at a target based on said reproduced history information.

22. An information storage medium for creating a game image with which a player plays, comprising:
information for creating a game image in which an auxiliary computer player acts in cooperation with the player, said auxiliary computer player assisting the player in game playing; and
information for comparing the game result of the player and the game result of said auxiliary computer player and for creating an image for selecting another auxiliary computer player that acts in a different manner from said auxiliary computer player when the game result of the player is ahead of the game result of said auxiliary computer player.

23. A games machine for creating a game image with which a player shoots at a given target by using an offensive object, comprising:
means for recording history information for specifying shooting timing and at least one of the position and direction of shooting in one game session;
means for reproducing said history information in another game session that differs from said one game session; and
means for creating a game image in which a virtual player participates in said other game session together with the player, said virtual player and said player interacting in shooting at common targets, said virtual player interacting with the player in shooting at the targets based on said reproduced history information and affecting the game result of the player.

24. An information storage medium for creating a game image with which a player plays, comprising:
information for recording history information relating to the performance of the player in one game session;
information for reproducing said history information in another game session that differs from said one game session; and
information for creating a game image in which a virtual player participates in said other game session together with the player, and for applying to the player game rules depending on action of the virtual player and on action of at least one common opponent, said virtual player acting against each common opponent based on said reproduced history information and affecting the game result of the player.

25. An information storage medium for creating a game image with which a player shoots at a given target by using an offensive object, comprising:
information for recording history information for specifying shooting timing and at least one of the position and direction of shooting in one game session;
information for reproducing said history information in another game session that differs from said one game session; and
information for creating a game image in which a virtual player participates in said other game session together with the player, said virtual player and said player interacting in shooting at common targets, said virtual player interacting with the player in shooting at the targets based on said reproduced history information and affecting the game result of the player.

26. An image synthesis method for creating a game image with which a player plays, the method including:
recording history information relating to the performance of the player in one game session;
reproducing said history information in another game session that differs from said one game session; and
creating a game image in which a virtual player participates based on said reproduced history information in said other game session together with the player, a plurality of actions of said virtual player throughout the one game session affecting the game result of the player during the other game session.

27. An image synthesis method for creating a game image with which a player plays, the method including:
recording history information relating to the performance of the player in one game session;
reproducing said history information in another game session that differs from said one game session; and
creating a game image in which a virtual player participates based on said reproduced history information in said other game session to assist the player.

28. An image synthesis method for creating a game image with which a player plays, the method including:
   recording history information relating to the performance of the player in one game session;
   reproducing said history information in another game session that differs from said one game session; and
   creating a game image in which a virtual player participates based on said reproduced history information in said other game session to cooperate with the player.

29. An image synthesis method for creating a game image with which a player plays, the method including:
   recording history information relating to the performance of the player in one game session;
   reproducing said history information in another game session that differs from said one game session; and
   creating a game image in which a virtual player participates based on said reproduced history information in said other game session to compete against the player.

30. A game machine for creating a game image with which a player plays, the game machine including:
   a storage medium that records history information relating to the performance of the player in one game session and reproduces said history information in another game session that differs from said one game session; and
   a controller that creates a game image in which a virtual player participates based on said reproduced history information in said other game session together with the player, a plurality of actions of said virtual player throughout the one game session affecting the game result of the player during the other game session.

31. A game machine for creating a game image with which a player plays, the game machine including:
   a storage medium that records history information relating to the performance of the player in one game session and reproduces said history information in another game session that differs from said one game session; and
   a controller that creates a game image in which a virtual player participates based on said reproduced history information in said other game session to assist the player.

32. A game machine for creating a game image with which a player plays, the game machine including:
   a storage medium that records history information relating to the performance of the player in one game session and reproduces said history information in another game session that differs from said one game session; and
   a controller that creates a game image in which a virtual player participates based on said reproduced history information in said other game session to cooperate with the player.

33. A game machine for creating a game image with which a player plays, the game machine including:
   a storage medium that records history information relating to the performance of the player in one game session and reproduces said history information in another game session that differs from said one game session; and
   a controller that creates a game image in which a virtual player participates based on said reproduced history information in said other game session to compete against the player.

34. A storage medium for creating a game image with which a player plays, the method including:
   information for recording history information relating to the performance of the player in one game session;
   information for reproducing said history information in another game session that differs from said one game session; and
   information for creating a game image in which a virtual player participates based on said reproduced history information in said other game session together with the player, a plurality of actions of said virtual player throughout the one game session affecting the game result of the player during the other game session.

35. A storage medium for creating a game image with which a player plays, the method including:
   information for recording history information relating to the performance of the player in one game session;
   information for reproducing said history information in another game session that differs from said one game session; and
   information for creating a game image in which a virtual player participates based on said reproduced history information in said other game session to assist the player.

36. A storage medium for creating a game image with which a player plays, the method including:
   information for recording history information relating to the performance of the player in one game session;
   information for reproducing said history information in another game session that differs from said one game session; and
   information for creating a game image in which a virtual player participates based on said reproduced history information in said other game session to cooperate with the player.

37. A storage medium for creating a game image with which a player plays, the method including:
   information for recording history information relating to the performance of the player in one game session;
   information for reproducing said history information in another game session that differs from said one game session; and
   information for creating a game image in which a virtual player participates based on said reproduced history information in said other game session to compete against the player.

* * * * *